United States Patent
Okamoto et al.

(10) Patent No.: US 7,478,306 B2
(45) Date of Patent: Jan. 13, 2009

(54) METHOD OF DETECTING ERROR LOCATION, AND ERROR DETECTION CIRCUIT, ERROR CORRECTION CIRCUIT, AND REPRODUCING APPARATUS USING THE METHOD

(75) Inventors: Miyuki Okamoto, Hashima (JP); Satoshi Kanai, Mizuho (JP); Masato Fuma, Ichinomiya (JP)

(73) Assignee: Sanyo Electric Co., L:td., Osaka (JP)

( * ) Notice: Subject to any disclaimer, the term of this patent is extended or adjusted under 35 U.S.C. 154(b) by 475 days.

(21) Appl. No.: 11/092,894

(22) Filed: Mar. 30, 2005

(65) Prior Publication Data
US 2005/0229070 A1 Oct. 13, 2005

(30) Foreign Application Priority Data
Mar. 31, 2004 (JP) ............................. 2004-107934

(51) Int. Cl.
*H03M 13/00* (2006.01)
(52) U.S. Cl. ...................................................... 714/758
(58) Field of Classification Search .................. 714/758
See application file for complete search history.

(56) References Cited

U.S. PATENT DOCUMENTS

| | | | | |
|---|---|---|---|---|
| 5,631,909 A | * | 5/1997 | Weng et al. | 714/704 |
| 6,052,815 A | * | 4/2000 | Zook | 714/758 |
| 6,378,100 B1 | * | 4/2002 | Van Dijk et al. | 714/752 |
| 7,111,222 B2 | * | 9/2006 | Takagi et al. | 714/755 |
| 2004/0205444 A1 | * | 10/2004 | Arao et al. | 714/788 |

FOREIGN PATENT DOCUMENTS

| | | |
|---|---|---|
| JP | 2001-515641 | 9/2001 |
| JP | 2003-036608 | 2/2003 |

OTHER PUBLICATIONS

Chinese Office Action, with English translation, issued in Chinese Patent Application No. 200510062954.6 dated on Dec. 14, 2008.
Japanese Office Action, with English Translation issued in Japanese Patent Application No. 2004-107934, dated on Sep. 18, 2007.

* cited by examiner

*Primary Examiner*—M. Mujtaba K Chaudry
*Assistant Examiner*—Sam Rizk
(74) *Attorney, Agent, or Firm*—McDermott Will & Emery LLP (57) ABSTRACT

An error correction circuit capable of detecting burst errors included in a data signal with reliability. The error correction circuit comprises a reading unit, a first estimation unit, a second estimation unit, and a correction unit. The reading unit reads the data signal. The first estimation unit estimates error locations based on BIS code included in the data signal, and stores the locations into an error location storing unit. The second estimation unit estimates error locations based on characteristics of bit strings adjoining the BIS code, and stores the locations into the error location storing unit. The correction unit identifies erasure locations based on the error locations stored in the error location storing unit, and performs erasure correction on the erasure locations identified. Since the error locations are estimated based on the BIS code and the characteristics of the bit strings adjoining the BIS code as well, it is possible to detect burst errors without fail.

6 Claims, 10 Drawing Sheets

METHOD OF DETECTING ERROR LOCATION, AND ERROR DETECTION CIRCUIT, ERROR CORRECTION CIRCUIT, AND REPRODUCING APPARATUS USING THE METHOD

BACKGROUND OF THE INVENTION

1. Field of the Invention

The invention relates to a signal processing technology. In particular, the invention relates to a method of detecting an error included in a data signal, an error detection circuit using the method, an error correction circuit using the method, and a reproducing apparatus using the method.

2. Description of the Related Art

High-capacity optical disk devices using red laser, such as a digital versatile disk (DVD), have been already put to practical use. Recently, next-generation optical disks which use blue laser sources of near 650 nm in wavelength are under intensive development for the sake of further enhanced recording capacities. Maximizing the recording capacities requires that higher error correction capabilities be provided aside from improved linear recording densities and narrower tracks resulting from a reduction in the wavelength of the recording light sources.

For example, DVD disks have minimum mark lengths of 0.6 micrometers and above. Next-generation optical disks using a blue laser source have minimum mark lengths of no greater than 0.3 micrometers. With the decreasing minimum mark length, the amount of information capable of being written to an identical area physically increases. Thus, given the same dimensions of flaws or dust particles on a disk surface, burst errors occurring on a next-generation disk have impact twice or more higher than on a DVD disk. There have thus been some techniques in which error correction code for burst error detection (hereinafter, referred to simply as "burst indicator subcode" or "BIS code") is distributed within data in a discrete fashion and is used for correction (for example, Japanese Patent Laid-Open Publication No. 2001-515641).

Figure 1:
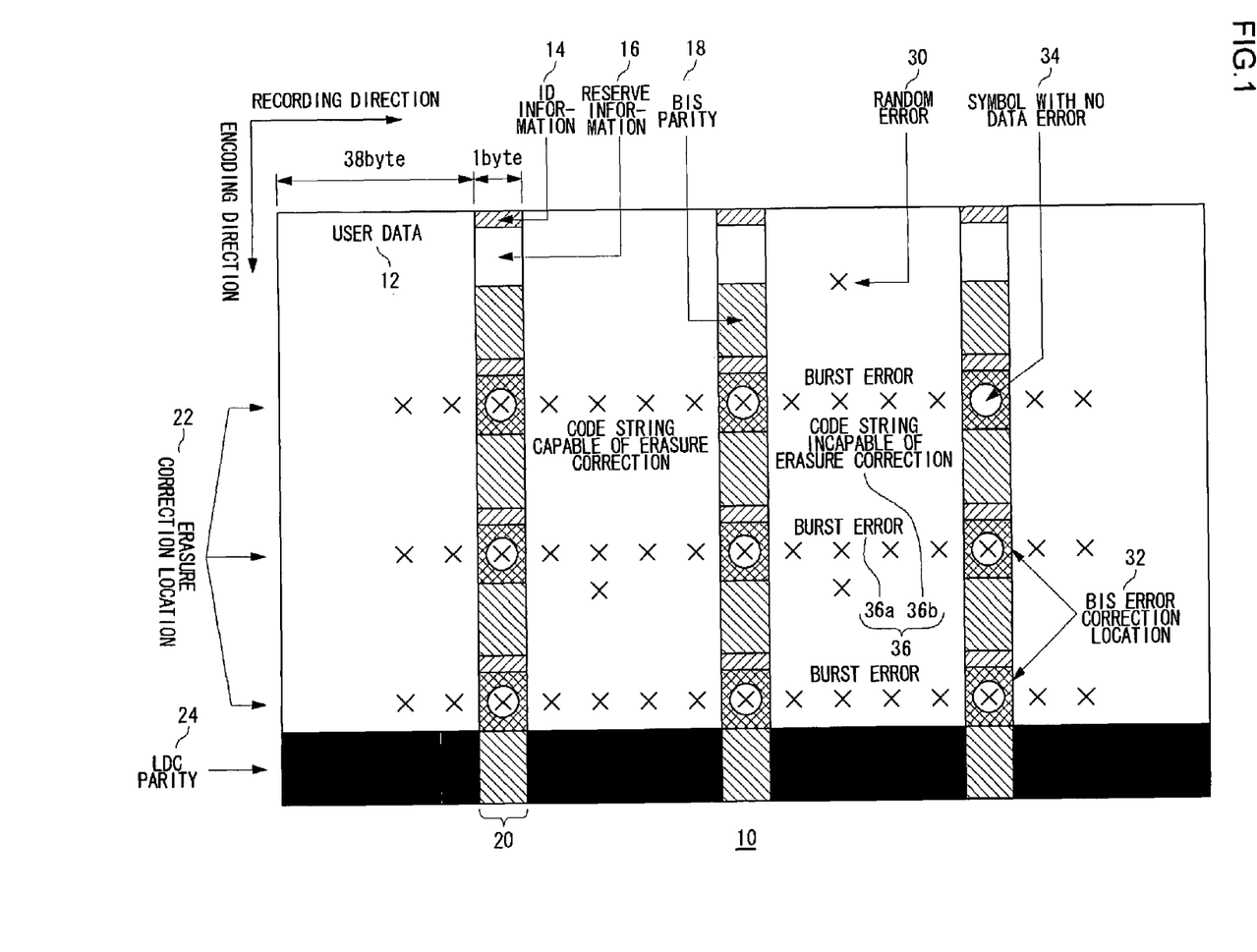
FIG. 1 is a diagram showing the distribution of errors in a code block.

FIG. 1 is a diagram showing the distribution of errors in a code block 10. In this diagram, the vertical direction is the encoding direction, and the horizontal direction is the recording direction and the reading direction of an optical disk. The code block 10 contains BIS code 20, user data 12 which is encoded in LDC (Long Distance Code), and LDC parities 24. The BIS code 20 includes ID information 14, reserve information 16, and BIS parities 18. For example, 216 bytes of user data 12 are accompanied with 32 bytes of parity 216, and 30 bytes of BIS code 20 are accompanied with 32 bytes of parity. In this diagram, "X" represents a location where an error occurs. Random errors 30 which occur sporadically and burst errors 36 which occur continuously are shown separately. A first burst error 36a is a code string that can be corrected by erasure correction. A second burst error 36b is a code string that cannot be detected as a burst error and thus is incapable of erasure correction.

Burst errors occur from such factors as disk flaws and adhesion of dust particles to the disk surface. When these phenomena arise, a large change typically occurs in the intensity of the reflected laser beam. A signal reproducing circuit amplifies the output of an intensity detector typically mounted on the head by using a head amplifier. The resultant is passed through a variable gain amplifier called AGC and/or an equalizer circuit for RF waveform shaping, followed by binarization and demodulation. Here, if the input signal level exhibits a large transient or the output amplitude of the head amplifier drops significantly, the binary output becomes "high" or "low" in level so that the demodulator often outputs 0s or 1s consecutively.

Random errors 30 are detected and corrected by using the LDC parities 24. Burst errors 36 are subjected to erasure correction. To perform erasure correction, it is necessary to recognize the locations of the burst errors 36. The BIS code 20 is used for this purpose. The BIS code 20 is arranged at predetermined logical addresses in stripes on the code block. To estimate the location of a burst error 36, error correction on the BIS code 20 is initially performed by using the BIS parities 18, so that error locations on the BIS code 20 are identified. Since the BIS code 20 is arranged at the predetermined logical addresses in stripes, a burst error 36 is estimated to occur near a location where errors of the BIS code 20 are corrected consecutively in the recording direction. Then, erasure correction is performed with that location as an erasure location.

In general, the reserve information 16 has bit values of "0" while a burst error 36 results from a series of predetermined bit values of either "1" or "0". Thus, even if a burst error having bit values of "0" occurs across a piece of reserve information 16, that location cannot be corrected by the correction of the BIS code 20 since the reserve information 16 is not erroneous in terms of the bit value itself. In the diagram, first symbols 32 marked with "O " on "X" represent the locations where error correction is conducted by using the BIS parities 18. A second symbol 34 marked with "O " indicates that the location, despite being a burst error, will not be recognized as an error. For erasure correction, erasure correction locations 22 are identified by using the error-corrected locations of the BIS code 20 as clues. Thus, a location where no error correction is performed on the BIS code 20, i.e., where the user data 12 and the reserve information 16 match with each other and look like having no error, such as shown by the second symbol 34, will not be detected as an error location despite of the burst error 36. It is therefore impossible to estimate the erasure location of the second burst error 36b, or perform erasure correction thereon. In this way, there can often occur such cases that second burst errors 36b cannot be detected.

SUMMARY OF THE INVENTION

The present invention has been achieved in view of the foregoing problems. It is thus an object of the present invention to provide a method of detection an error location, and an error detection circuit, an error correction circuit, and a reproducing circuit using the method.

One of the aspects of the present invention is a method of detecting an error location included in a data signal. This method comprises: reading a data signal; determining whether or not a predetermined bit value appears consecutively both in a detection code for estimating an error location included in the read data signal and in an adjoining bit string; and estimating that a location where the bit value appears consecutively both in the detection code and in the adjoining bit string is an error location. The "adjoining bit string" may adjoin before or after the detection code in a time-series fashion, or may adjoin both before and after the detection code.

According to this aspect, an error location included in the data signal is estimated based on the detection code and the bit string adjoining the same. It is therefore possible to detect an error location that cannot be detected on the basis of the detection code.

Another aspect of the present invention is a circuit which detects an error location included in a data signal. This circuit comprises: a reading unit which reads a data signal; a first estimation unit which estimates an error location based on a detection code for estimating an error location included in the read data signal; and a second estimation unit which estimates an error location based on a characteristic of a bit string adjoining the detection code included in the read data signal. For example, the "characteristic of a bit string" may be one pertaining to bit values, such as how many bit values of either "0" or "1" appear consecutively.

According to this aspect, an error location is estimated based on the detection code, and an error location is also estimated based on the characteristic of the bit string adjoining the detection code. It is therefore possible to estimate the error location that cannot be detected by the detection code alone. This improves the capability of detecting error locations.

The second estimation unit may estimate that a location where a bit value to be read as the detection code and the same bit value appear consecutively is an error location. For example, the "bit value to be read as the detection code" may be one that is to be read as the detection code when the data signal contains no error. Consequently, the second estimation unit can estimate an error location even when the detection code seems to have no error.

The detection code may have a predetermined bit value that is written at a predetermined logical address. In this case, the first estimation unit may estimate that the location of a bit value different from the one to be read as the detection code is an error location.

Still another aspect of the present invention is a circuit which corrects an error included in a data signal. This circuit comprises: a reading unit which reads a data signal; a first estimation unit which estimates an error location based on a detection code for estimating an error location included in the read data signal; a second estimation unit which estimates an error location based on a characteristic of a bit string adjoining the detection code included in the read data signal; and a correction unit which corrects the error locations estimated by the first estimation unit and the second estimation unit. This improves the capability of detecting error locations, and improves the capability of error correction.

Still another aspect of the present invention is a reproducing apparatus. This apparatus comprises: a reading unit which reads a data signal recorded on a recording medium; a first estimation unit which estimates an error location based on a detection code for estimating an error location included in the read data signal; a second estimation unit which estimates an error location based on a characteristic of a bit string adjoining the detection code; a correction unit which corrects the error locations estimated by the first estimation unit and the second estimation unit; and a reproduction unit which performs reproduction based on the corrected data signal. This improves the capability of detecting error locations and improves the capability of error correction, thereby allowing high quality reproduction.

Incidentally, any combinations of the foregoing components, and the expressions of the present invention converted among methods, apparatuses, systems, recording media, computer programs, and the like are also intended to constitute applicable aspects of the present invention.

DETAILED DESCRIPTION OF THE INVENTION

First Embodiment

A first embodiment will deal with a method of detecting an error location included in a data signal and a circuit for correcting an error location by using the detection method.

Figure 2:
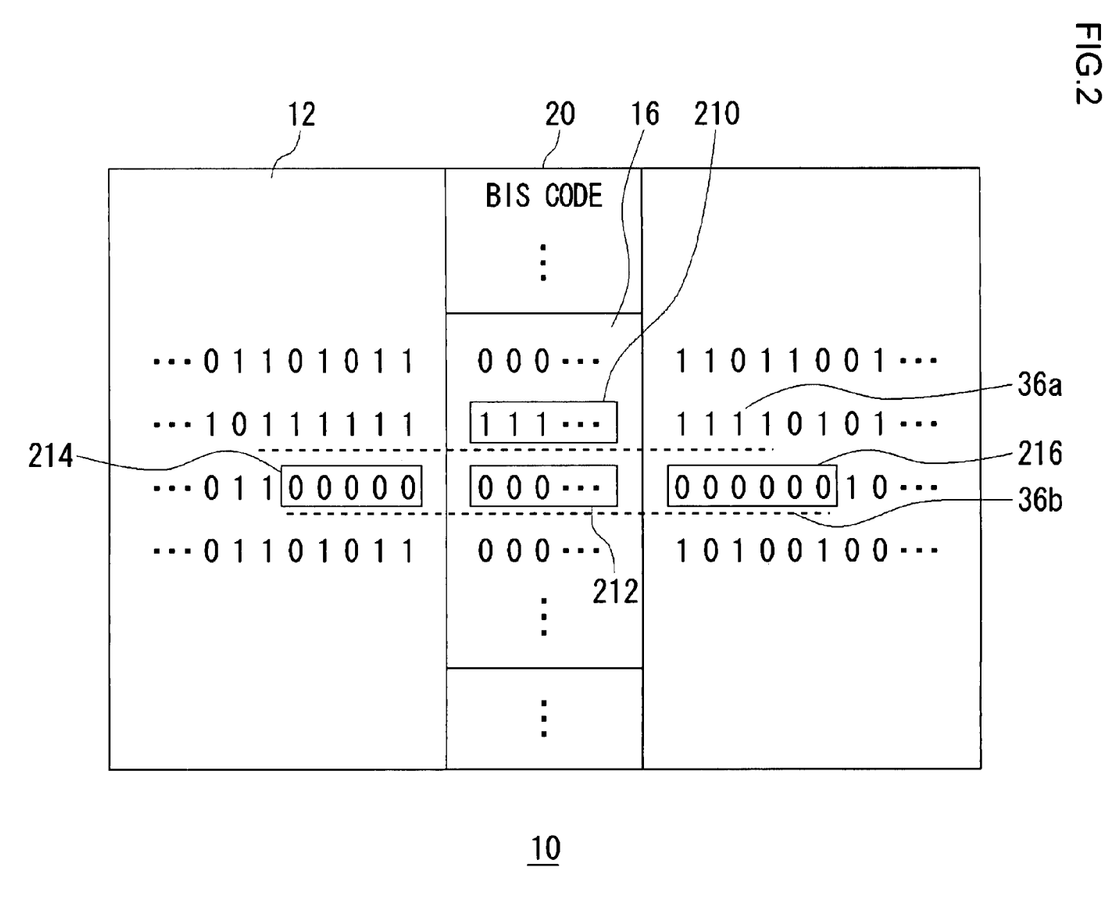
FIG. 2 is a diagram for explaining a method of detecting an error location according to a first embodiment.

FIG. 2 is a diagram for explaining the method of detecting an error location according to the first embodiment. This diagram shows part of a code block 10. The code block 10 contains user data 12 and BIS code 20. In general, when there is no error, all the bit values of reserve information 16 in the BIS code 20 are "0". When a burst error occurs and bit values "1" appear consecutively as in a first burst error 36a, the reserve information 16 which is supposed to have bit values "0" exhibits bit values "1" as in the first reserve information 210. The first reserve information 210 is detected as an error location during correction processing on the BIS code 20. On the other hand, if bit values "0" appear consecutively as in a second burst error 36b, the error location will not be detected during the correction processing on the BIS code 20 since the second reserve information 212 seems to have no error.

Then, in the method of detecting an error location according to the embodiment, error locations are estimated by a combination of the microscopic detection processing based on the BIS code 20 and macroscopic detection processing based on characteristics of bit strings adjoining the BIS code 20. More specifically, when at least either one of a first bit string 214 adjoining before the BIS code 20 or a second bit string 216 adjoining behind the same contains consecutive bit values of "0" beyond a predetermined number, that location is estimated as an error location. Consequently, even when the second burst error 36b which has consecutive bit values of "0" occurs in the vicinity of the reserve information 16, it is possible to estimate the second burst error 36b.

Figure 3:
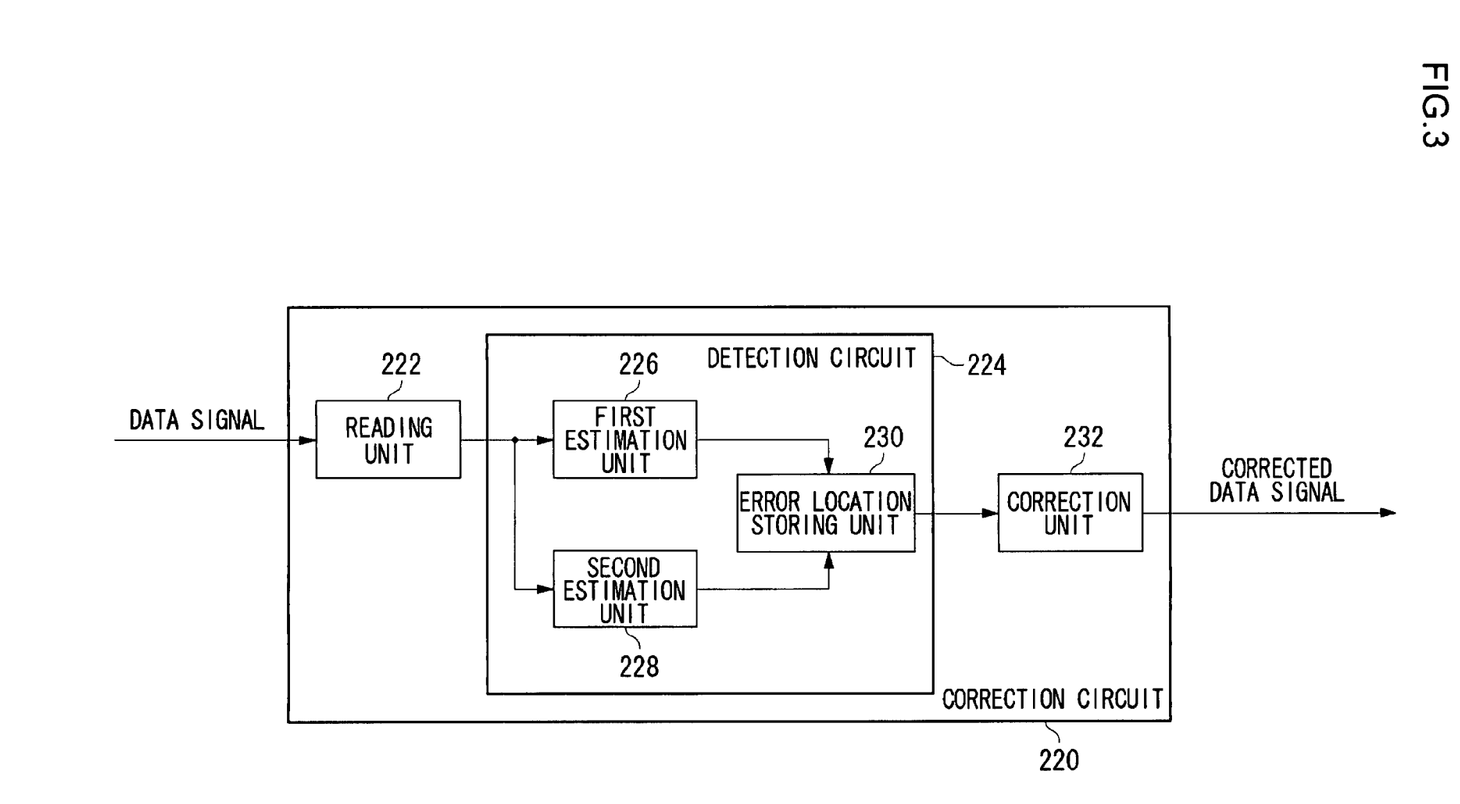
FIG. 3 is a block diagram showing a correction circuit for correcting errors included in a data signal by using the method of detecting an error location described with reference to FIG. 2.

FIG. 3 is a block diagram showing a correction circuit 220 for correcting errors included in a data signal by using the method of detecting an error location described with reference to FIG. 2. The individual components of the correction circuit 220 may be practiced as electronic circuits composed of various electronic parts. The components may also be achieved by software means, including a CPU and a memory of an arbitrary computer, a program which is loaded on the memory and realizes the components shown in the diagram, and a storage unit such as a hard disk which contains the program. Electronic circuits and software may be used in combination. It will be understood by those skilled in the art that various modifications may be made to the methods and devices for practice. It should be noted that the drawings to be seen below show functional blocks, not hardware configuration.

A reading unit 222 reads the data signal. The reading unit 222 may read the data signal from any sources including optical disks and other recording media, broadcasting signals, and networks. A detection circuit 224 detects error locations included in the data signal. A correction unit 232 corrects the error locations detected by the detection circuit 224, and outputs the corrected data signal.

The detection circuit 224 has a first estimation unit 226, a second estimation unit 228, and an error location storing unit 230. The first estimation unit 226 estimates an error location by applying correction processing to the BIS code 20 of FIG. 2, and stores the location into the error location storing unit 230. The second estimation unit 228 estimates a location as an error location when a bit string adjoining the BIS code 20 has a predetermined characteristic. Then, the location is stored into the error location storing unit 230.

Position information on the error locations may be stored by an arbitrary method. For example, the address of a BIS code 20 containing an error may be registered. Each code block may be provided with a map so that error-indicating flags are registered thereon at positions corresponding to error locations. What is essential is only that the locations estimated to suffer data erasure due to burst errors be registered with appropriate indications. The following description will simply employ the expression "to register locations" regardless of the type of the storing method. Based on the error locations stored in the error location storing unit 230, the correction unit 232 identifies erasure locations and performs erasure correction. More specifically, the correction unit 232 implements the logical add operation of the error locations estimated by the first estimation unit 226 and the second estimation unit 228, and performs erasure correction on the locations.

Figure 4:
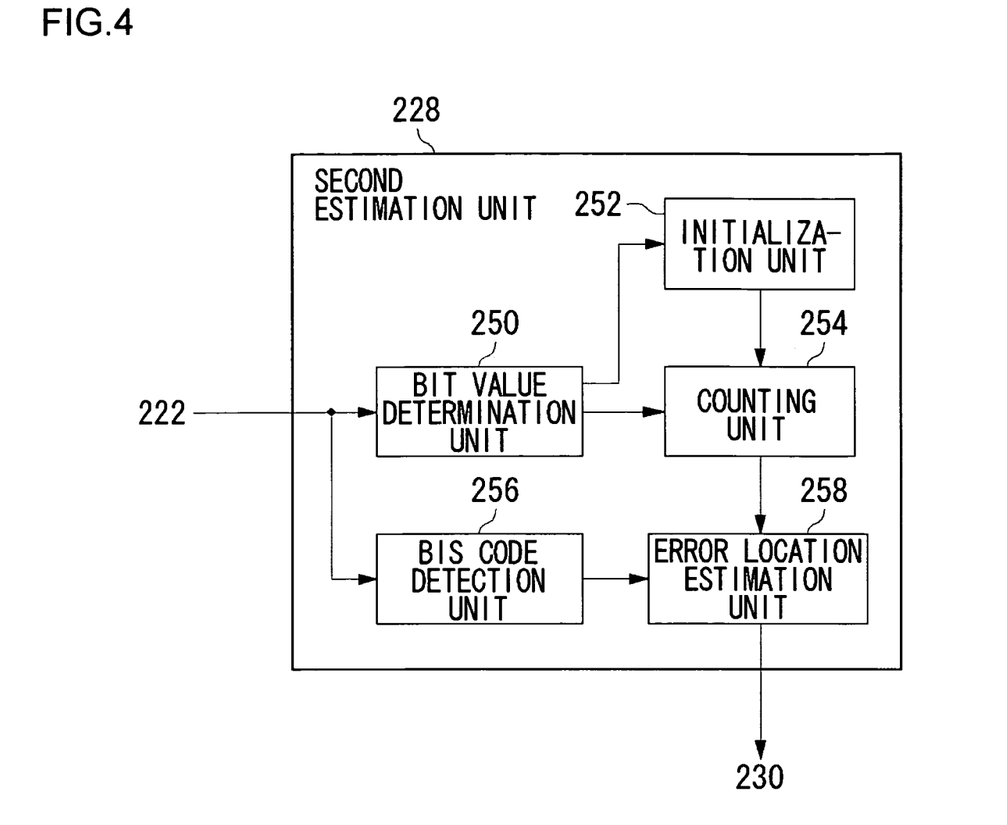
FIG. 4 is an internal block diagram showing a second estimation unit of FIG. 3.

FIG. 4 is an internal block diagram showing the second estimation unit 228 of FIG. 3. A bit value determination unit 250 accepts the data signal supplied from the reading unit 222 successively, and determines whether or not each of the bits has a predetermined bit value. The bit value to be compared by the bit value determination unit 250 is one to be read as the reserve information 16 when no error occurs (hereinafter, referred to simply as "ideal bit value"). That is, the bit value determination unit 250 determines if each individual bit included in the data signal has the ideal bit value.

If a bit included in the data signal has the ideal bit value, the bit value determination unit 250 instructs a counting unit 254 to increment its count. If a bit included in the data signal does not have the ideal bit value, the bit value determination unit 250 instructs an initialization unit 252 to initialize the count kept by the counting unit 254. Based on the instruction, the initialization unit 252 resets the count of the counting unit 254. The counting unit 254 counts the number of predetermined bit values to appear consecutively, incrementing the count based on the instruction from the bit value determination unit 250. The counting unit 254 also resets the count, or restores it to "0", based on the instruction from the initialization unit 252.

A BIS code detection unit 256 detects detection code for detecting error locations included in the data signal, i.e., the BIS code 20. Since the BIS code 20 is recorded at predetermined logical addresses, the BIS code detection unit 256 detects the bit values lying at the predetermined logical addresses as the BIS code 20. For example, the BIS code 20 is recorded in three sections each having a width of 1 byte in the recording direction, at intervals of 38 bytes in the recording direction. When the BIS code 20 is arranged thus, the BIS code detection unit 256 detects the next one byte at every 38 bytes as a BIS code 20.

When the BIS code detection unit 256 detects the BIS code 20, an error location estimation unit 258 reads the count at that point from the counting unit 254, and determines whether or not the BIS code 20 is a part of a burst error. If the count falls within a predetermined range, or between a minimum value A and a maximum value B, the error location estimation unit 258 determines that the BIS code 20 is a part of a burst error. That is, the error location estimation unit 258 estimates the location of the BIS code 20 as an error location. If the count does not fall within the predetermined range, the error location estimation unit 258 determines that the BIS code 20 is not a part of a burst error. Hereinafter, the range to be used for this determination will be referred to simply as "criteria". In general, the user data 12 is scrambled so that 1s and 0s appear at almost equal proportions. For this reason, 1s or 0s typically will not appear consecutively beyond a predetermined number. The criteria are preferably set to a range that will not occur in ordinary user data 12. For example, the criteria may be set to values greater than a maximum continuous length that is derived from the modulation rule. It is understood that experimental optimum values may be used as the criteria.

Figure 5:
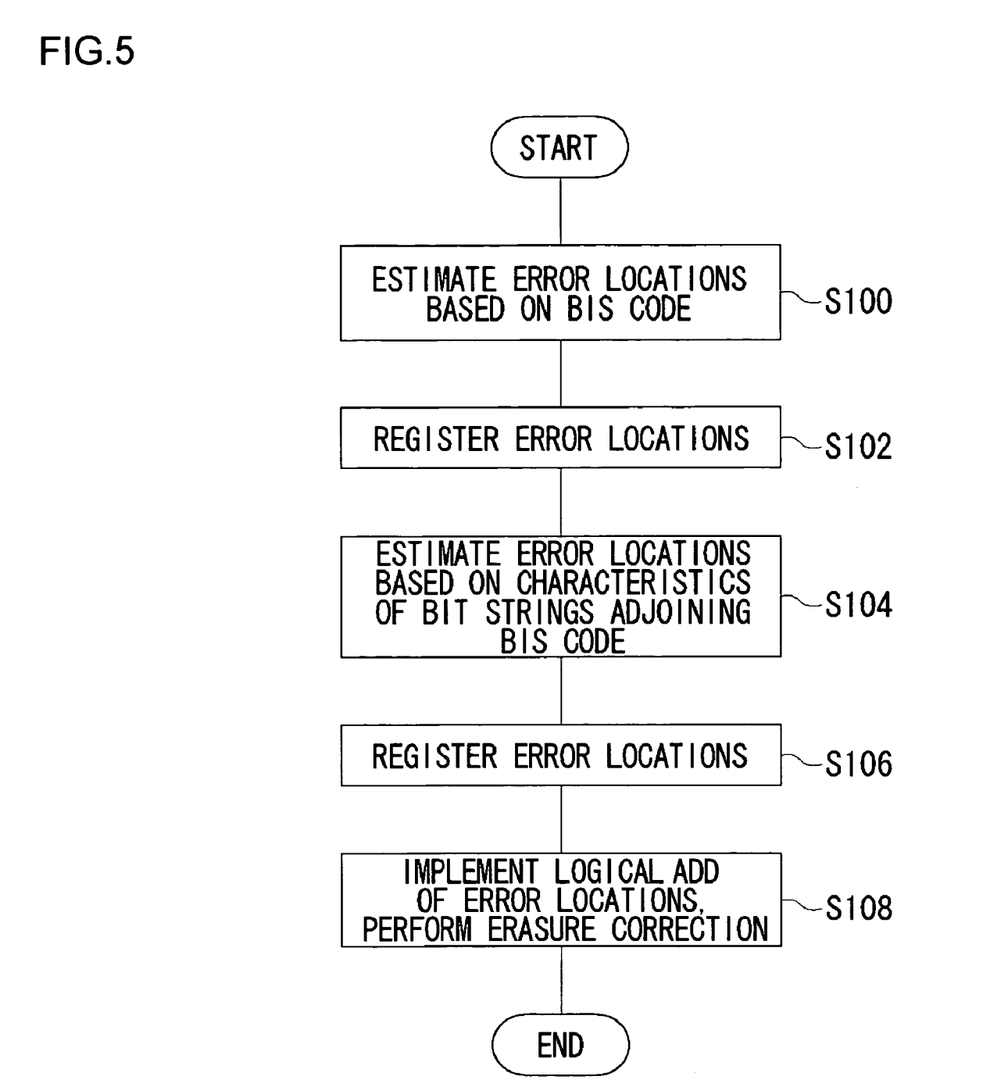
FIG. 5 is a flowchart showing correction processing by the correction circuit of FIG. 3.

FIG. 5 is a flowchart showing the correction processing by the correction circuit 220 of FIG. 3. The first estimation unit 226 of FIG. 3 estimates error locations based on the BIS code 20 included in the data signal (S100), and registers the error locations to the error location storing unit 230 of FIG. 3 (S102). The second estimation unit 228 of FIG. 3 estimates error locations based on the characteristics of the bit strings adjoining the BIS code 20 (S104), and registers the error locations to the error location storing unit 230 (S106). Then, the correction unit 232 of FIG. 3 implements the logical add operation of the error locations registered in the error location storing unit 230, so as to avoid redundant estimations of the error locations, and performs erasure correction based on each of the error locations (S108).

Second Embodiment

A second embodiment will deal with an apparatus having the function of applying correction processing to a data signal read from an optical disk by using the method of detecting an error location described in the first embodiment.

Figure 6:
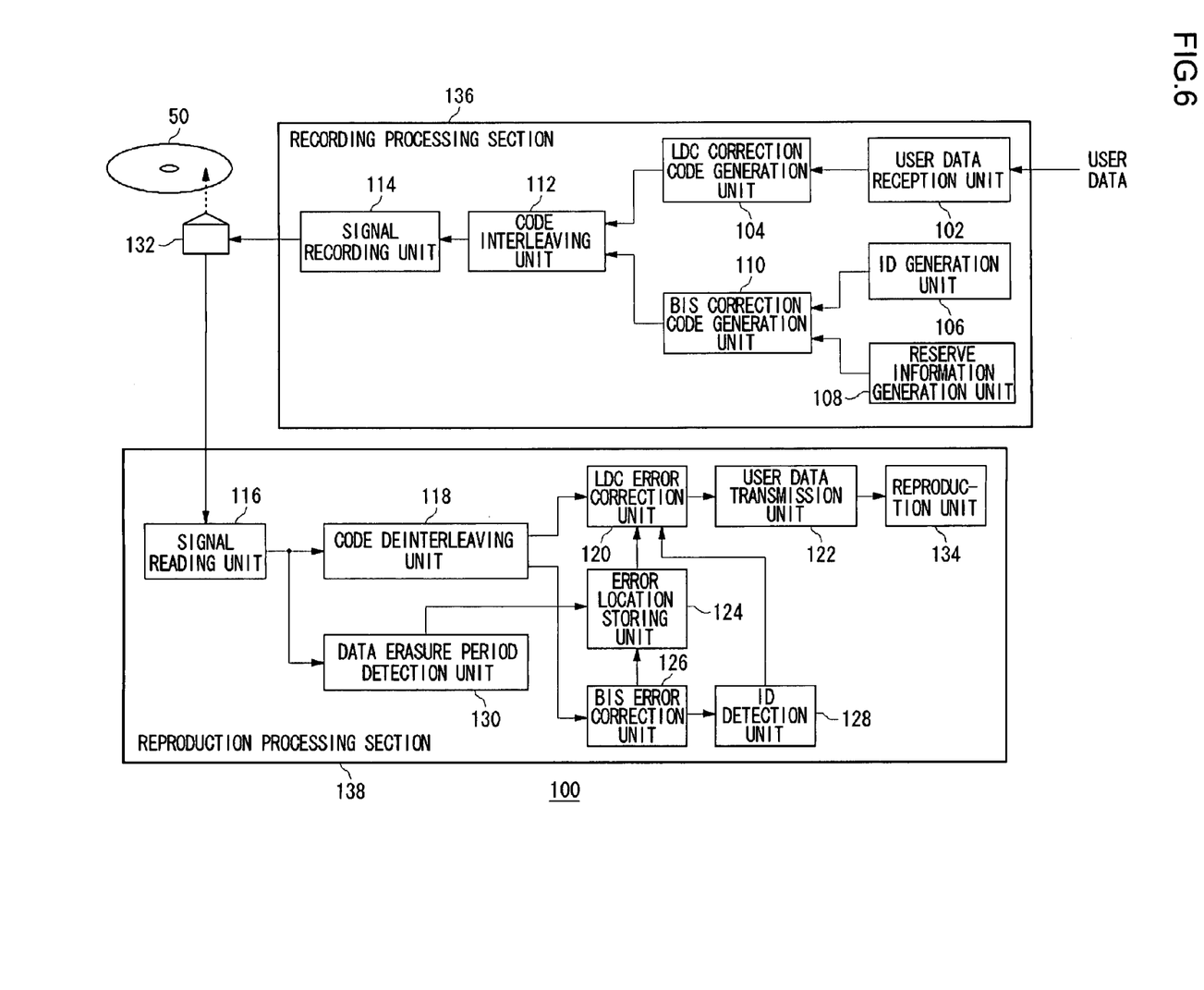
FIG. 6 is a block diagram showing a recording and reproducing apparatus according to a second embodiment.

FIG. 6 is a block diagram showing a recording and reproducing apparatus 100 according to the second embodiment. The recording and reproducing apparatus 100 has a recording processing section 136 and a reproduction processing section 138. Initially, description will be given of the recording processing section 136. A user data reception unit 102 is an interface for receiving data, for example, from a host computer, an MPEG image encoder, or the like. An LDC correction code generation unit 104 generates parities from the data received at the user data reception unit 102, thereby generating LDC error correction code. An ID generation unit 106 generates addresses corresponding to recording locations of the user data on an optical disk 50, i.e., ID information. A reserve information generation unit 108 generates a predetermined value of data, such as "00" in hexadecimal, as reserve information when the data area of BIS error correction code has an unused space (reserve area).

A BIS correction code generation unit 110 generates parities for the ID information and the reserve information, thereby generating BIS error correction code. A code interleaving unit 112 applies interleaving processing to the LDC error correction code and the BIS error correction code in accordance with a predetermined error correction format.

Figure 7:
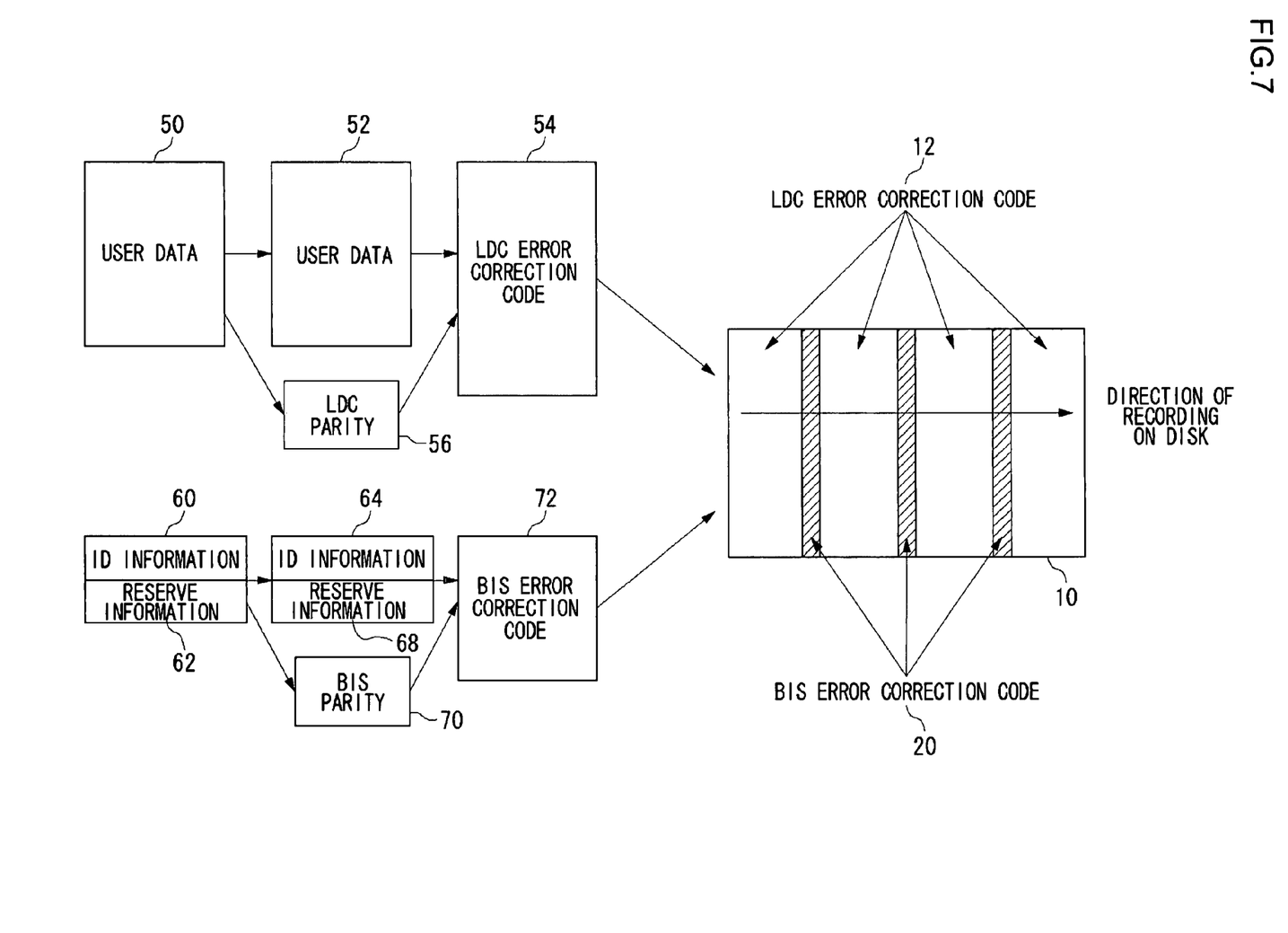
FIG. 7 is a diagram showing the steps of generating a code block having a predetermined error correction format.

FIG. 7 is a diagram showing the steps of generating a code block 10 having a predetermined error correction format. The user data reception unit 102 of FIG. 6 receives user data 50. The LDC correction code generation unit 104 of FIG. 6 encodes the user data 50 in the encoding direction orthogonal to the data recording direction, thereby generating encoded user data 52 and LDC parities 56. Then, the user data 52 and the LDC parities 56 are combined to generate LDC error correction code 54.

Meanwhile, the ID generation unit 106 of FIG. 6 generates ID information 60 which shows the recording locations on the optical disk 50 of FIG. 6. The reserve information generation unit 108 of FIG. 6 generates reserve information 62 such that all the bit values of the reserve areas are "0". The BIS correction code generation unit 110 of FIG. 6 encodes the data of the ID information 60 and the data of the reserve information 62 in the encoding direction, thereby generating encoded ID information 64, encoded reserve information 68, and BIS parities 70. Then, the ID information 64, the reserve information 68, and the BIS parities 70 are combined to generate BIS error correction code 72. The LDC error correction code 54 and the BIS error correction code 72 are interleaved into a code block 10 in which the BIS code 20 is arranged in stripes according to the predetermined format. The code block 10 is recorded on the optical disk 50 from the left to right, in order from the top. That is, the logical address at the top left is the lowest, and the logical address at the bottom right is the highest. Specifically, for example, one byte of BIS code 20 is initially recorded on the optical disk. Then, 38 bytes of LDC error correction code, or user data 12, are recorded. Subsequently, one byte of BIS code 20 and 38 bytes of user data 12 are recorded alternately.

Returning to FIG. 6, a signal recording unit 114 modulates the data generated by the code interleaving unit 112 under a predetermined rule, and transmits the modulated waves to an optical head 132. The optical head 132 irradiates the optical disk 50 with a laser beam, and records the data. The optical head 132 is controlled by a not-shown focus tracking control unit. In this way, the data conforming to the error correction format described with reference to FIG. 7 is recorded on the optical disk 50.

Next, description will be given of the reproduction processing section 138. A signal reading unit 116 reads data from the optical disk 50, and performs binarization and demodulation on the read signal. A code deinterleaving unit 118 makes an operation reverse to that of the code interleaving unit 112. That is, the code deinterleaving unit 118 separates the data acquired from the signal reading unit 116 into LDC error correction code and BIS error correction code, thereby allowing error correction processing.

A BIS error correction unit 126 corresponds to the first estimation unit 226 of FIG. 3. The BIS error correction unit 126 performs error correction on the BIS error correction code to obtain ID information, and registers error-corrected locations of the code block 10 into an error location storing unit 124. An ID detection unit 128 extracts ID information from the BIS error correction code corrected.

A data erasure period detection unit 130 corresponds to the second estimation unit 228 of FIG. 3. The internal structure of the data erasure period detection unit 130 is the same as that of the second estimation unit 228. That is, the data erasure period detection unit 130 has such components as the BIS code detection unit 256 for detecting the BIS code 20 and the counting unit 254 for counting the number of consecutive bit values of "0".

Based on the data signal yet to be deinterleaved, which is supplied from the signal reading unit 116 successively, the data erasure period detection unit 130 detects the periods in which bit strings adjoining the BIS code 20 exhibit bit values of "0" consecutively. The data erasure period detection unit 130 also registers the locations of BIS codes 20 adjoining the detected locations in the code block 10 into the error location storing unit 124. That is, if any bit string adjoining the BIS code 20 has consecutive bit values of "0", the data erasure period detection unit 130 determines the location as the one where a burst error occurs.

An LDC error correction unit 120, as will be detailed later, performs erasure correction based on the ID information supplied from the ID detection unit 128 and the information on the error locations stored in the error location storing unit 124. In addition, the LDC error correction unit 120 detects and corrects random errors. A user data transmission unit 122 outputs demodulated user data to a reproduction unit 134. The reproduction unit 134 is an MPEG decoder, for example. The reproduction unit 134 decodes and reproduces the corrected user data.

Figure 8:
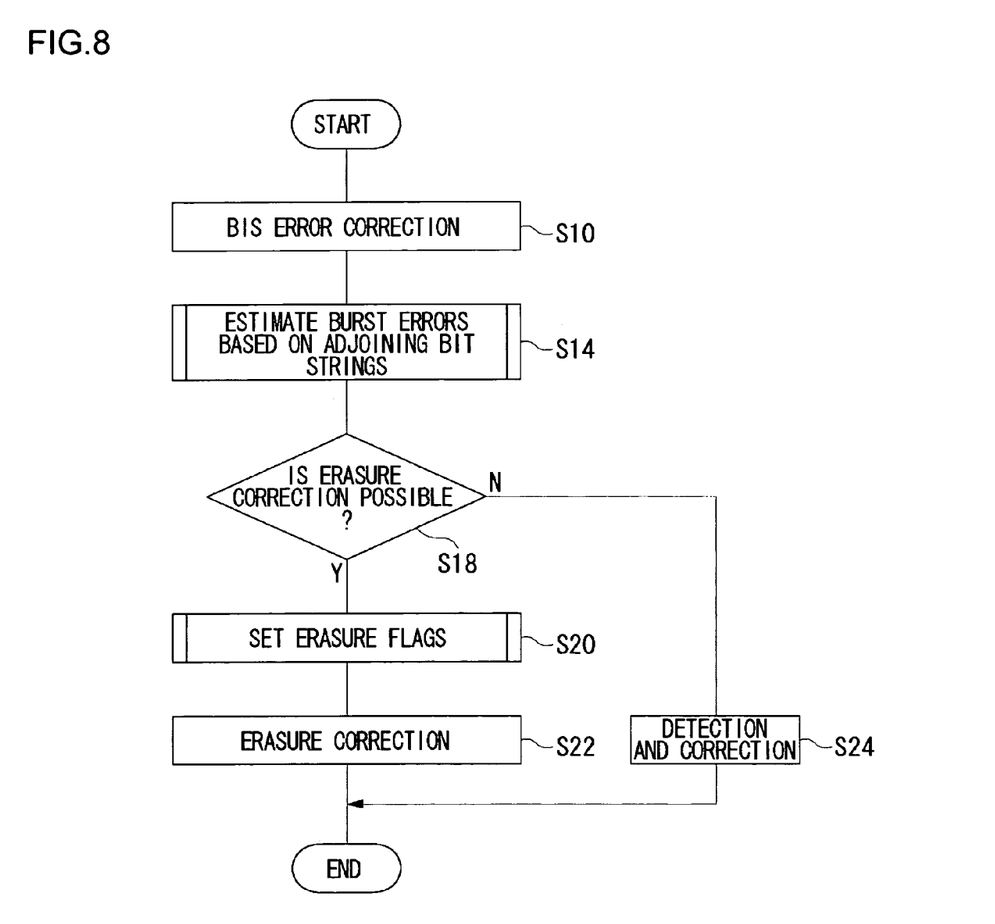
FIG. 8 is a flowchart showing erasure correction processing by a reproduction processing section of FIG. 6.

FIG. 8 is a flowchart showing the correction processing by the reproduction processing section 138 of FIG. 6. Initially, the BIS error correction unit 126 of FIG. 6 performs error correction on the BIS code 20 (S10). Then, the BIS error correction unit 126 registers error-corrected locations into the error location storing unit 124 of FIG. 6. The data erasure period detection unit 130 of FIG. 6 estimates the locations of burst errors based on the characteristics of bit strings adjoining the BIS code 20, included in the yet-to-be-deinterleaved data signal output from the signal reading unit 116 of FIG. 6 (S14). Then, the data erasure period detection unit 130 registers the locations of the burst errors estimated into the error location storing unit 124 as error locations.

The LDC error correction unit 120 of FIG. 6 refers to the information on the error locations stored in the error location storing unit 124, and determines whether LDC-based erasure correction is possible or not (S18). More specifically, the LDC error correction unit 120 determines the presence or absence of an erasure point by referring to the information on the error locations stored in the error location storing unit 124. If erasure correction is possible (Y at S18), the LDC error correction unit 120 sets an erasure flag (S20), and performs erasure correction (S22). If erasure correction is impossible at step 18 (N at S18), the LDC error correction unit 120 performs detection and correction (S24).

Figure 9:
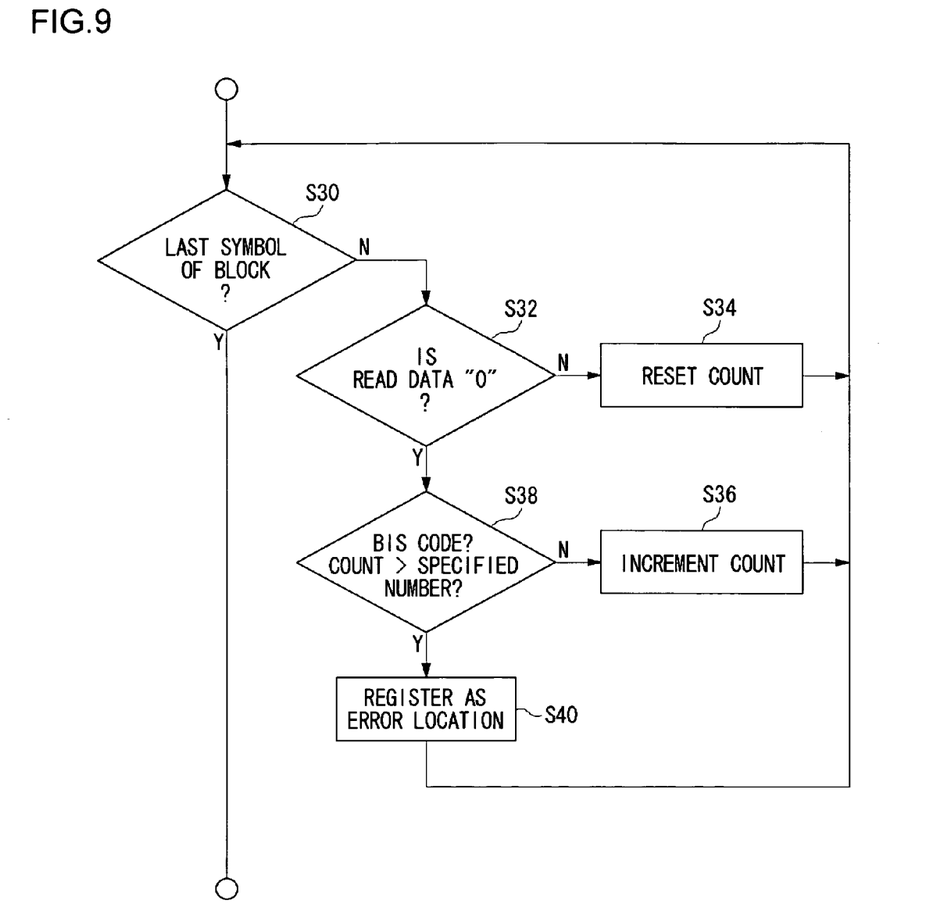
FIG. 9 is a flowchart showing the details of processing of FIG. 8, in which burst errors are estimated based on the characteristics of adjoining bit strings.

FIG. 9 is a flowchart showing the details of the processing at step 14 of FIG. 8, in which burst errors are estimated based on the characteristics of adjoining bit strings. The data erasure period detection unit 130 of FIG. 6 determines whether or not the read data signal is the last symbol which indicates the end of the code block (S30). If it is the last symbol (Y at S30), the processing moves to step 18 of FIG. 8. If not the last symbol (N at S30), the data erasure period detection unit 130 determines whether or not the read data has the bit value of "0" (S32). If "0" (Y at S32), the data erasure period detection unit 130 determines whether or not the data is a BIS code 20 and the count of bit values "0" falls within the criteria (S38).

If the data is a BIS code 20 and the count of bit values "0" falls within the criteria (Y at S38), the data erasure period detection unit 130 registers the location of the BIS code 20 into the error location storing unit 124 of FIG. 6 as an error location (S40). At step 38, if the condition that the data is a BIS code 20 and the count of bit values "0" falls within the criteria is not satisfied (N at S38), the data erasure period detection unit 130 increments the count of 0s (S36). At step 32, if the bit value of the read data is not "0" (N at S32), the data erasure period detection unit 130 initializes the count of 0s (S34). This flowchart is for situations where the determination is targeted for bit strings adjoining before the BIS code 20. In another example, the determination may be targeted for bit strings adjoining behind the BIS code 20, or for bit strings adjoining both before and after.

Figure 10:
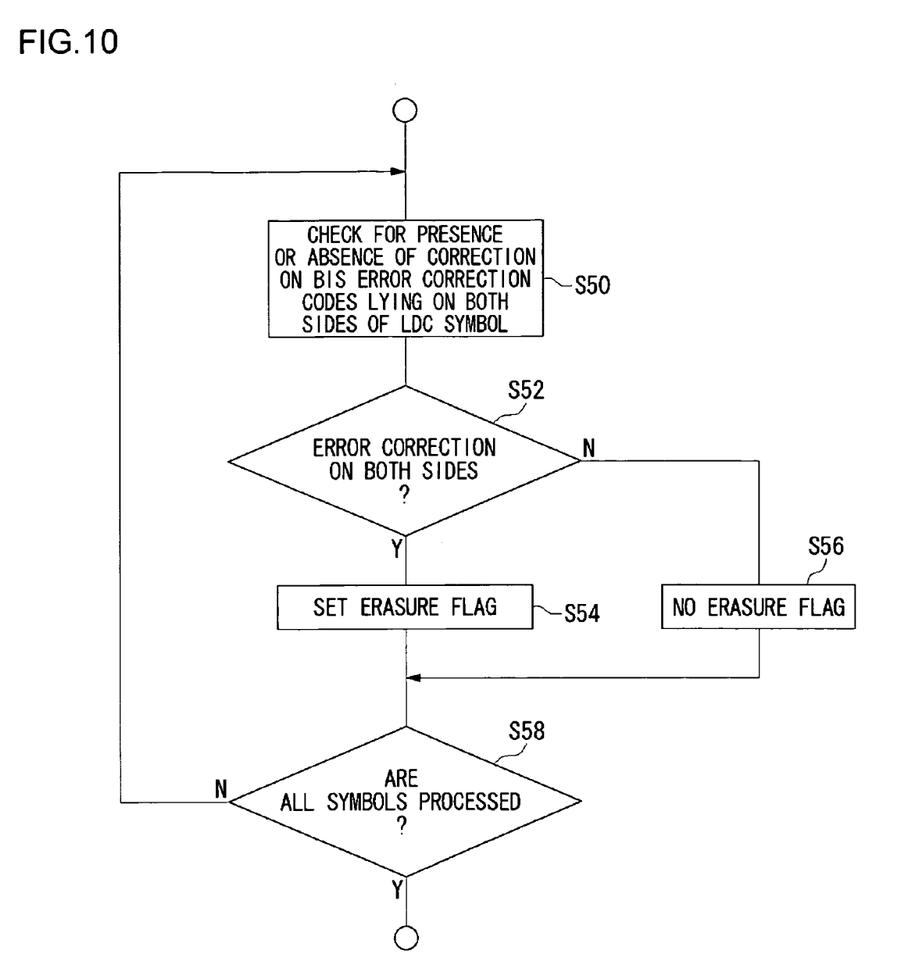
FIG. 10 is a flowchart showing the details of processing for setting an erasure flag of FIG. 8.

FIG. 10 is a flowchart showing the details of the processing for setting an erasure flag at step 20 of FIG. 8. When erasure correction can be made on the LDC error correction code, the LDC error correction unit 120 of FIG. 6 initially consults the error location storing unit 124 to check the following two pieces of decoding information with respect to each byte of the LDC error correction code in the encoding direction (S50). One is the decoding information on a BIS error correction code lying in front of and the closest to that byte, and the other is the decoding information on a BIS error correction code lying behind and the closest to that byte. Here, the "decoding information" shall contain information indicating the presence or absence of error correction.

If both the BIS error correction codes in front and behind have had errors and been corrected (Y at S52), the LDC error correction unit 120 estimates that the LDC error correction code lying therebetween is also involved in the burst error. The LDC error correction unit 120 sets an erasure flag on that byte (S54). At step 52, if the BIS error correction codes on both sides have had no error and been uncorrected, or either one of the codes has been corrected (N at S52), the LDC error correction unit 120 determines that there is no burst error, and sets no erasure flag (S56). Then, when all the symbols have gone through these processes (Y at S58), the processing moves to step 22 of FIG. 8. If not all the symbols have gone through (N at S58), the processing returns to step 50.

Up to this point, the present invention has been described in conjunction with the embodiments thereof. These embodiments have been given solely by way of illustration. It will be understood by those skilled in the art that various modifications may be made to combinations of the foregoing components and processes, and all such modifications are also intended to fall within the scope of the present invention. For example, while the recording and reproducing apparatus 100 of FIG. 6 is configured to record data onto the optical disk 50 and read data from the optical disk 50, the recording medium is not limited to the optical disk 50. In a modification, the optical head 132 may be replaced with a magnetic head so that a magnetic disk is used as the recording medium.

What is claimed is:

1. A method of detecting an error location, comprising:
    reading a data signal in which a plurality of detection codes for estimating an error location are periodically inserted;
    applying an error correction process on the plurality of detection codes and estimating that an error correction location is a first error location;
    determining whether or not a bit value that should appear when no errors occur appears consecutively in a bit string adjoining the plurality of detection codes;
    estimating that a location where the bit value appears consecutively in the bit string adjoining the plurality of detection codes is a second error location; and
    deriving a logical sum of the first error location and the second error location.

2. An error detection circuit comprising:
    a reading unit which reads a data signal in which a plurality of detection codes for estimating an error location are periodically inserted;
    a first estimation unit which applies an error correction process on the plurality of detection codes and estimates that an error correction location is a first error location;
    a determination unit which determines whether or not a bit value that should appear when no errors occur appears consecutively in a bit string adjoining the plurality of detection codes;
    a second estimation unit which estimates that a location where the bit value appears consecutively in the bit string adjoining the plurality of detection codes is a second error location; and
    a deriving unit which derives a logical sum of the first error location and the second error location.

3. The error detection circuit according to claim 2, wherein the second estimation unit includes:
    a counting unit which reads the data signal successively and counts the number of consecutive bits having an identical bit value;
    a detection unit which reads the data signal successively and detects the detection code; and
    a determination unit which determines that a location where the number of counted bits in a bit string adjoining the detection code detected exceeds a predetermined number is an error location.

4. The error detection circuit according to claim 2, wherein:
    the plurality of detection codes have a predetermined bit value written at a predetermined logical address; and
    the first estimation unit estimates that the location of a bit value different from the one to read as the plurality of detection codes is an error location.

5. An error correction circuit comprising:
    a reading unit which reads a data signal in which a plurality of detection codes for estimating an error location are periodically inserted;
    a first estimation unit which applies an error correction process on the plurality of detection codes and estimates that an error correction location is a first error location;
    a determination unit which determines whether or not a bit value that should appear when no errors occur appears consecutively in a bit string adjoining the plurality of detection codes;
    a second estimation unit which estimates that a location where the bit value appears consecutively in the bit string adjoining the plurality of detection codes is a second error location; and
    a correction unit which derives a logical sum of the first error location and the second error location and corrects the error locations based on the logical sum.

6. A reproducing apparatus comprising:
    a reading unit which reads a data signal, in which a plurality of detection codes for estimating an error location are periodically inserted, recorded on a recording medium;
    a first estimation unit which applies an error correction process on the plurality of detection codes and estimates that an error correction location is a first error location;
    a determination unit which determines whether or not a bit value that should appear when no errors occur appears consecutively in a bit string adjoining the plurality of detection codes;
    a second estimation unit which estimates that a location where the bit value appears consecutively in the bit string adjoining the plurality of detection codes is a second error location;
    a correction unit which derives a logical sum of the first error location and the second error location and corrects the error locations based on the logical sum; and
    a reproduction unit which performs reproduction based on the corrected data signal.

* * * * *